United States Patent
Fujii et al.

(10) Patent No.: US 9,877,011 B2
(45) Date of Patent: Jan. 23, 2018

(54) IMAGE DISPLAY APPARATUS AND IMAGE DISPLAY METHOD

(71) Applicant: Hitachi Kokusai Electric, Inc., Tokyo (JP)

(72) Inventors: Miyuki Fujii, Tokyo (JP); Wataru Ito, Tokyo (JP)

(73) Assignee: Hitachi Kokusai Electric Inc., Tokyo (JP)

(*) Notice: Subject to any disclaimer, the term of this patent is extended or adjusted under 35 U.S.C. 154(b) by 219 days.

(21) Appl. No.: 14/766,845

(22) PCT Filed: Mar. 14, 2014

(86) PCT No.: PCT/JP2014/056952
§ 371 (c)(1),
(2) Date: Aug. 10, 2015

(87) PCT Pub. No.: WO2014/148394
PCT Pub. Date: Sep. 25, 2014

(65) Prior Publication Data
US 2016/0065944 A1   Mar. 3, 2016

(30) Foreign Application Priority Data

Mar. 19, 2013 (JP) .................. 2013-056729

(51) Int. Cl.
*H04N 13/02* (2006.01)
*G06T 15/20* (2011.01)
*B60R 1/00* (2006.01)
*H04N 7/18* (2006.01)
*G06T 3/00* (2006.01)

(52) U.S. Cl.
CPC .......... *H04N 13/0275* (2013.01); *B60R 1/00* (2013.01); *G06T 3/00* (2013.01); *G06T 15/20* (2013.01); *H04N 7/183* (2013.01); *H04N 13/0239* (2013.01); *H04N 13/0257* (2013.01); *H04N 13/0296* (2013.01); *B60R 2300/304* (2013.01); *B60R 2300/50* (2013.01); *B60R 2300/60* (2013.01)

(58) Field of Classification Search
None
See application file for complete search history.

(56) References Cited

U.S. PATENT DOCUMENTS

| | | | |
|---|---|---|---|
| 2010/0007550 A1* | 1/2010 | Nagamiya | ............... G01S 19/49 342/357.24 |
| 2013/0100132 A1* | 4/2013 | Katayama | .......... H04N 13/0022 345/420 |

FOREIGN PATENT DOCUMENTS

| | | |
|---|---|---|
| JP | 2001-84408 A | 3/2001 |
| JP | 2002-222488 A | 8/2002 |
| JP | 2005-268847 A | 9/2005 |
| JP | 2006-50263 A | 2/2006 |
| JP | 2008-217220 A | 9/2008 |
| JP | 2011-221686 A | 11/2011 |

OTHER PUBLICATIONS

International Search Report from International Application No. PCT/JP2014/056952 dated Jun. 17, 2014.

* cited by examiner

*Primary Examiner* — Frederick Bailey
(74) *Attorney, Agent, or Firm* — Brundidge & Stanger, P.C.

(57) ABSTRACT

An image display apparatus for converting an image into a virtual viewpoint image so that the image of an object is not distorted.

12 Claims, 10 Drawing Sheets

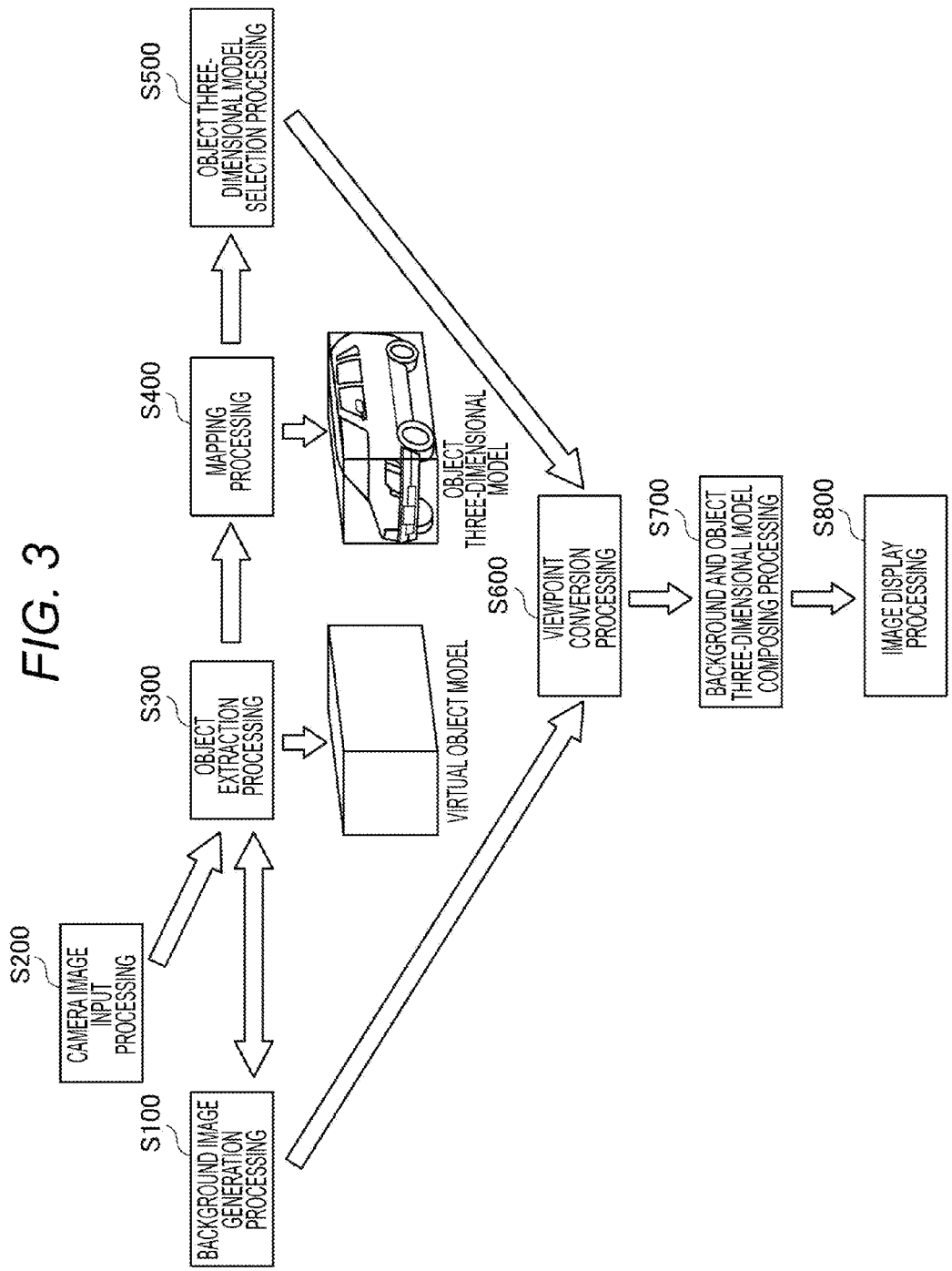

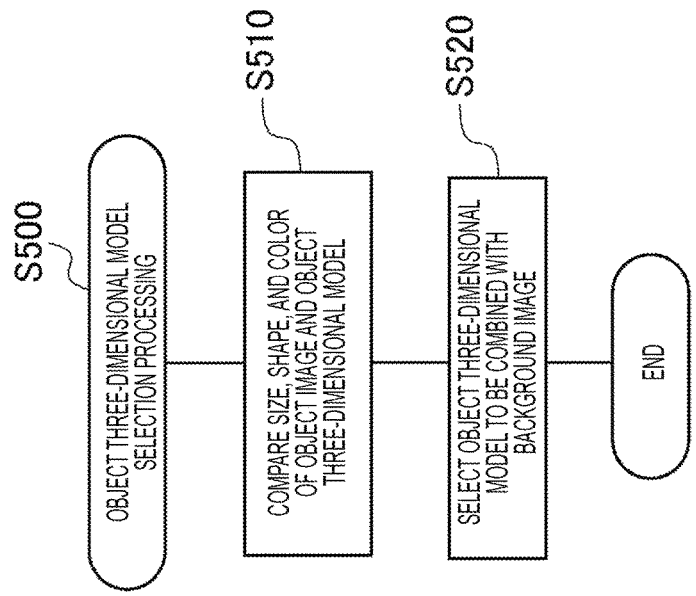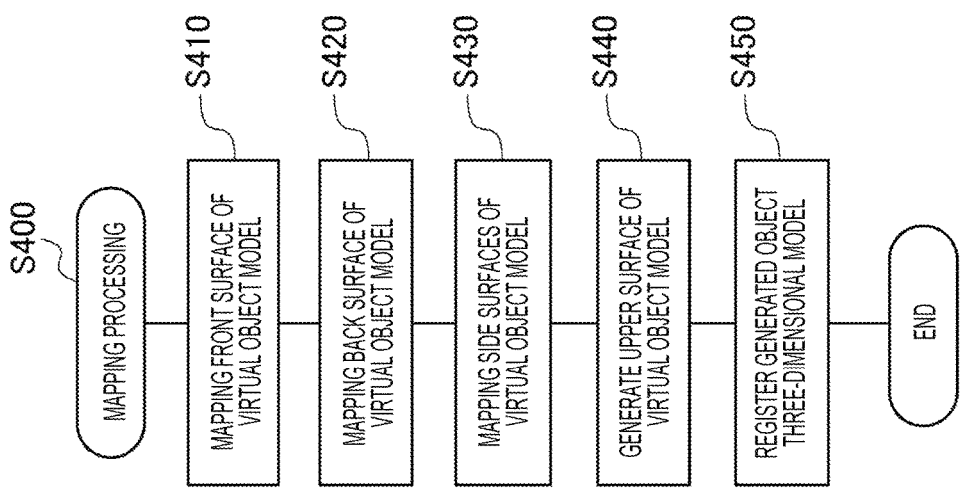

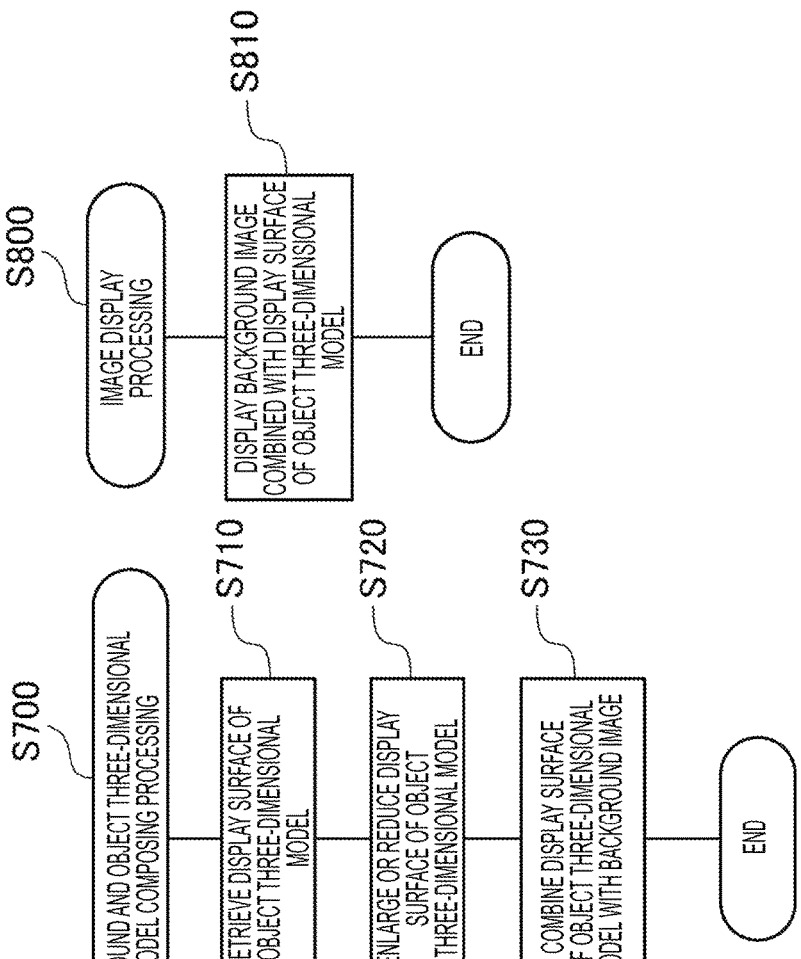

IMAGE DISPLAY APPARATUS AND IMAGE DISPLAY METHOD

TECHNICAL FIELD

The present invention relates to an image display apparatus for converting an image captured by a camera into an image that is seen from a viewpoint actually different from a viewpoint of a camera (hereinafter referred to as "virtual viewpoint") and displaying the image.

BACKGROUND ART

An image captured by a single camera or multiple cameras can be converted into an image that is seen from a designated virtual viewpoint (hereinafter referred to as "virtual viewpoint image"). For example, in an image generation method and apparatus thereof represented in Patent Document 1, the image generation method includes capturing an image of the surrounding of an automobile using one or multiple cameras attached to the automobile; generating an image of the automobile model that is texture-mapped (hereinafter referred to as "mapping") to a space model of a three-dimensional space according to information about this captured image; further detecting a change in a movable member such as a front door of the automobile; displaying the automobile model of the three-dimensional space by changing the position of the virtual viewpoint according to variation of the detected movable member; and displaying the detected movable member under distortion.

CITATION LIST

Patent Document

Japanese Patent Application Laid-Open Publication 2006-50263 A

SUMMARY OF THE INVENTION

Technical Problem

When an image of an object captured by a camera is converted into a virtual viewpoint image, three-dimensional information about the object may be lost, and therefore, there is a problem that an image of an object having some height, captured from the virtual viewpoint, may be distorted. When the image of the object captured by the camera having some height is converted into the virtual viewpoint image, an example of a converted image being distorted will be explained with reference to FIGS. 10A and 10B. As shown in FIG. 10A, a monitoring camera 600 is arranged in a position where the monitoring camera 600 can capture a vehicle 700 from the diagonally front direction of the vehicle 700 traveling on a roadway 10. Then, the image captured by the monitoring camera 600 is converted into an image that is likely to be seen from a virtual viewpoint 610 arranged above the vehicle 700. As described above, when the virtual viewpoint 610 is arranged to the position above the vehicle 700, the image of the vehicle 700 captured by the monitoring camera 600 is required to be converted into the image that is seen from above the vehicle 700. However, when the image captured by the monitoring camera 600 is converted into the image seen from the virtual viewpoint 610, an image 710 seen from the virtual viewpoint 610 is elongated in proportion to the height of the vehicle 700 as shown in FIG. 10B. Specifically, as a rear side of the vehicle 700 cannot be seen from the side of the monitoring camera 600, the length of the vehicle in the traveling direction is equal to the length of a projection 720 of the vehicle 700 onto the roadway 10 that is seen from the monitoring camera 600. Since the length of the projection 720 onto the roadway 10 becomes longer in proportion to the height of the vehicle 700, the image 710 becomes longer in proportion to the height of the vehicle 700. As described above, when the image captured by the monitoring camera 600 is converted into the image that is seen from the virtual viewpoint 610, there is a problem that the distortion of the image 710 seen from the virtual viewpoint 610 increases as the height of the vehicle 700 increases as a result of losing three-dimensional information about the vehicle 700.

The present invention is made in view of such circumstances, and it is an object of the present invention to provide an image display apparatus capable of solving the above problem.

Solution to Problem

An image display apparatus of the present invention includes background image obtaining means for retrieving a background image from an image, virtual object model extraction means for extracting a virtual object model from the image and the background image, object three-dimensional model generation means for generating an object three-dimensional model from the virtual object model, background image viewpoint conversion means for performing viewpoint conversion on the background image, object three-dimensional model viewpoint conversion means for performing viewpoint conversion on the object three-dimensional model, and composing means for combining the background image and the object three-dimensional model that have been viewpoint-converted. The object three-dimensional model generation means of the image display apparatus of the present invention includes mapping means for mapping the image to the virtual object model. The mapping means of the image display apparatus of the present invention performs mapping using the images captured by at least two cameras with different angles. The mapping means of the image display apparatus of the present invention includes, when a region on which the mapping is performed with the image overlaps, the mapping means performs mapping by using the image of which number of pixels is larger. The virtual object model extraction means of the image display apparatus of the present invention includes feature extraction means for extracting a feature of the virtual object model and object three-dimensional model selection means for selecting the object three-dimensional model according to the feature extracted by the feature extraction means. The virtual object model extraction means of the image display apparatus of the present invention includes speed measurement means for measuring a speed of an object corresponding to the virtual object model, and the object three-dimensional model selection means selects the object three-dimensional model combined with the background image by using the measured speed. The image display apparatus of the present invention includes, when the object three-dimensional model is combined with the background image, the object three-dimensional model is set so that the object three-dimensional model is in the same direction as a direction of a region where the object three-dimensional model is arranged.

Advantageous Effects of the Invention

The present invention provides an image display apparatus capable of converting and displaying an image of an

BRIEF DESCRIPTION OF DRAWINGS

FIG. 3 is a figure illustrating procedure for generating a virtual viewpoint image performed by an image display apparatus according to an exemplary embodiment of the present invention.

FIG. 6A is a flowchart of mapping processing according to an exemplary embodiment of the present invention.

FIG. 6B is a flowchart of object three-dimensional model selection processing according to an exemplary embodiment of the present invention.

FIG. 7A is a flowchart of viewpoint conversion processing according to an exemplary embodiment of the present invention.

FIG. 7B is a flowchart of background and virtual object model composing processing according to an exemplary embodiment of the present invention.

FIG. 7C is a flowchart of image display processing according to an exemplary embodiment of the present invention.

DESCRIPTION OF EXEMPLARY EMBODIMENTS

Hereinafter, an exemplary embodiment for carrying out the present invention (hereinafter referred to as "exemplary embodiment") will be explained with reference to drawings. The exemplary embodiment relates to an image display system for converting an image of a camera installed to capture images of vehicles traveling on a roadway into a virtual viewpoint image and displaying the virtual viewpoint image. The image display system according to the exemplary embodiment extracts a region where an object exists (hereinafter referred to as "object region") from images captured in an area where monitoring cameras are installed at four sides, i.e., front, back, right, and left (hereinafter referred to as "object three-dimensional model generation area"), and generates a three-dimensional model from an object region (hereinafter referred to as "object three-dimensional model"). The image of the object three-dimensional model and an image in a region other than the object region (hereinafter referred to as "background image") is subjected to viewpoint conversion to be converted into a virtual viewpoint image to be composed, so that the image of the vehicles is displayed in such a manner that the image of the vehicles is not distorted.

Figure 1:
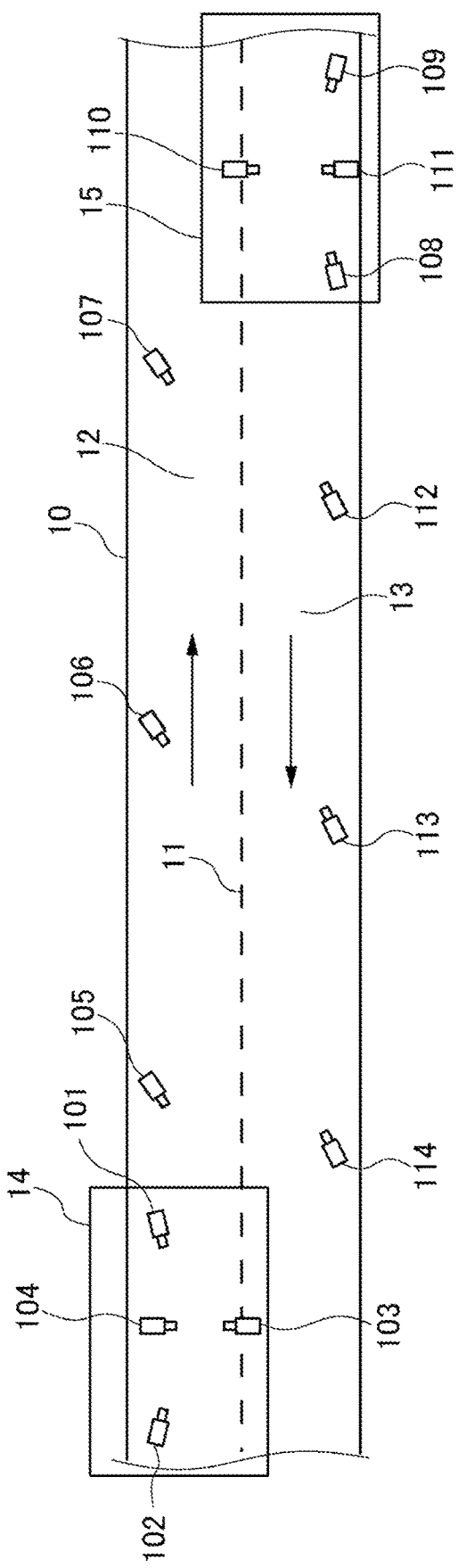
FIG. 1 is a figure illustrating an example of installation of a camera in a roadway where a vehicle travels according to an exemplary embodiment of the present invention.

Locations where the monitoring cameras are installed in a roadway on which vehicles travel according to the exemplary embodiment will be explained with reference to FIG. 1. As shown in FIG. 1, the roadway 10 is divided by a center line 11, the upper side of the center line 11 is an up-line traffic lane 12, and the lower side of the center line 11 is a down-line traffic lane 13. The up-line traffic lane 12 is provided with an object three-dimensional model generation area 14, and the down-line traffic lane 13 is provided with an object three-dimensional model generation area 15. In the object three-dimensional model generation area 14 of the up-line traffic lane 12, the following cameras are provided: a front surface monitoring camera 101 for capturing an image of a front surface side of a vehicle passing the object three-dimensional model generation area 14 of the up-line traffic lane 12; a back surface monitoring camera 102 for capturing an image of aback surface side; a side surface monitoring camera 103 for capturing an image of a side surface at the center line 11; and a side surface monitoring camera 104 for capturing an image of a side surface at a roadside. In the up-line traffic lane 12, vehicle monitoring cameras 105 to 107 are provided with a substantially equal interval along the roadway 10. Likewise, in the object three-dimensional model generation area 15 of the down-line traffic lane 13, the following cameras are provided: a front surface monitoring camera 108 for capturing an image of a front surface side of a vehicle passing the object three-dimensional model generation area 15 of the down-line traffic lane 13; aback surface monitoring camera 109 for capturing an image of a back surface side; a side surface monitoring camera 110 for capturing an image of a side surface at the center line 11, and a side surface monitoring camera 111 for capturing an image of a side surface at a roadside. In the down-line traffic lane 13, vehicle monitoring cameras 112 to 114 are provided with a substantially equal interval along the roadway 10.

Figure 2:
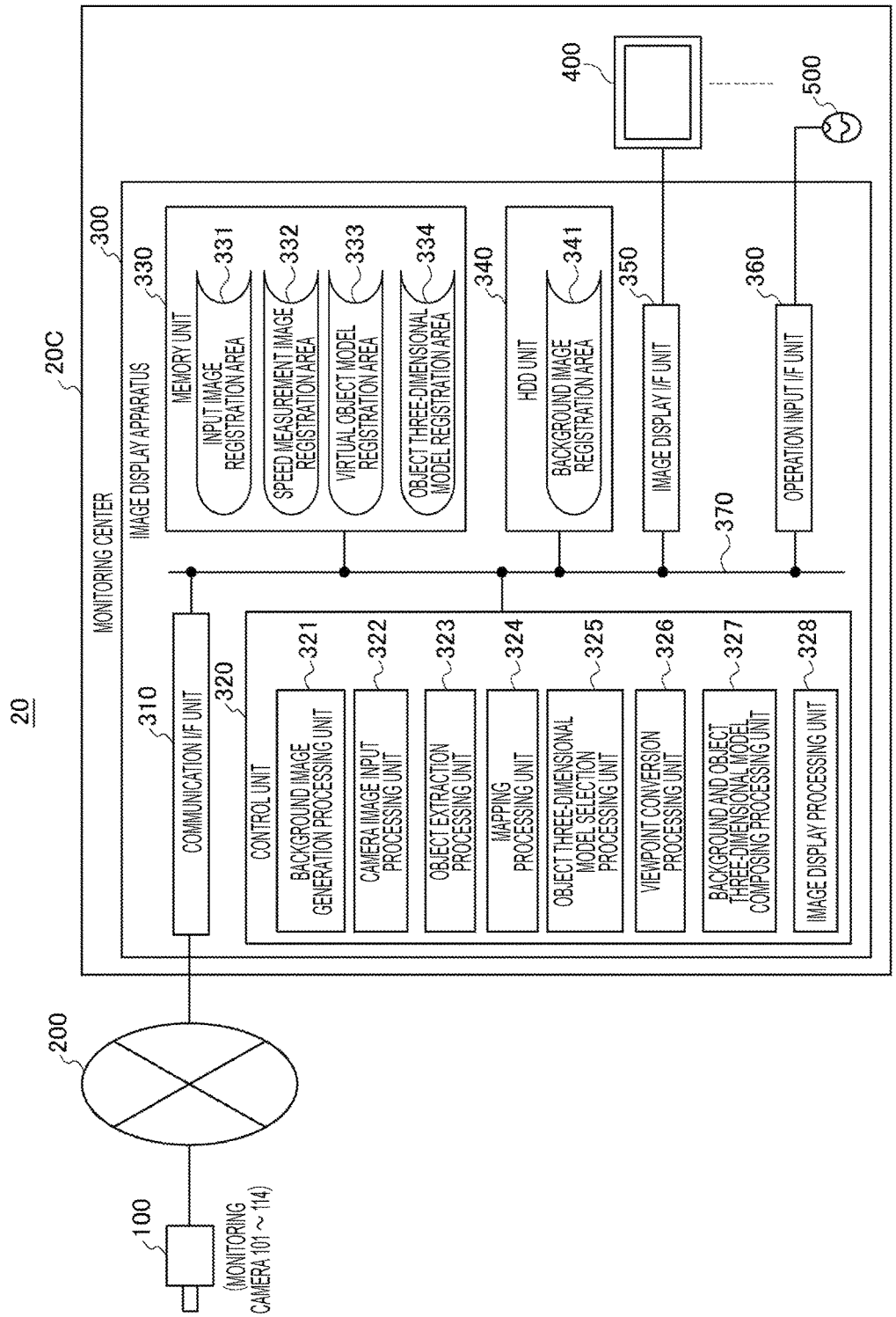
FIG. 2 is a figure illustrating a functional configuration of an image display apparatus and a configuration of an image display system according to an exemplary embodiment of the present invention.

A configuration of the image display system 20 according to the exemplary embodiment will be explained with reference to FIG. 2. As shown in FIG. 2, the image display system 20 includes a monitoring camera 100 (a generic term of a monitoring camera according to the exemplary embodiment including the monitoring cameras 101 to 114), a network 200, an image display apparatus 300, a monitor 400, and a mouse 500. The image display apparatus 300, the monitor 400, and the mouse 500 are installed in a monitoring center 20C where an observer is stationed. The monitoring camera 100 captures an image of a vehicle and the like traveling on the roadway 10, converts the captured image into image data, and transmits the image data via the network 200 to the image display apparatus 300. The network 200 connects the monitoring camera 100 installed at a location away from the monitoring center 20C and the image display apparatus 300 installed at the monitoring center 20C. In response to the image display apparatus 300 receiving image data from the monitoring camera 100, the image display apparatus 300 generates a virtual viewpoint image, converts image data of the virtual viewpoint image into an image signal that can be displayed, and outputs the image signal to the monitor 400. The image display apparatus 300 transmits operation data for operating a direction and the like of the monitoring camera 100 to the monitoring camera 100. The configuration of the image display apparatus 300 will be explained later. The monitor 400 displays an image of an image signal received from the image display apparatus 300. When the mouse 500 receives an operation performed by the observer, the mouse 500 converts the operation into operation data, and outputs the operation data to the image display apparatus 300.

A configuration of the image display apparatus 300 will be explained with reference to FIG. 2. The image display apparatus 300 includes a communication I/F unit 310, a control unit 320, a memory unit 330, an HDD (hard disk drive) unit 340, an image display I/F unit 350, an operation input I/F unit 360, and a data bus 370. The control unit 320 is provided with a background image generation processing unit 321, a camera image input processing unit 322, an object extraction processing unit 323, a mapping processing unit 324, an object three-dimensional model selection processing unit 325, a viewpoint conversion processing unit 326, a background and object three-dimensional model composing processing unit 327, and an image display processing unit 328. The memory unit 330 is provided with an input image registration area 331, a speed measurement image registration area 332, a virtual object model registration area 333, and an object three-dimensional model registration area 334. The HDD unit 340 is provided with a background image registration area 341.

Each unit constituting the image display apparatus 300 will be explained.

The communication I/F unit 310 is connected to the network 200, and receives image data transmitted from the monitoring camera 100, and saves the image data to the input image registration area 331 of the memory unit 330. When the communication I/F unit 310 receives an operation signal for operating the monitoring camera 100 from the control unit 320, the communication I/F unit 310 converts the operation signal into operation data, and transmits the operation data to the monitoring camera 100.

The control unit 320 includes control means such as a CPU, and centrally controls the image display apparatus 300. In the control unit 320, the operation data for operating the monitoring camera 100 received from the operation input I/F unit 360 is processed by the control unit 320, and the operation data are transmitted via the communication I/F unit 310 to a corresponding monitoring camera 100. The processing performed by the background image generation processing unit 321, the camera image input processing unit 322, the object extraction processing unit 323, the mapping processing unit 324, the object three-dimensional model selection processing unit 325, the viewpoint conversion processing unit 326, the background and object three-dimensional model composing processing unit 327, and the image display processing unit 328 provided in the control unit 320 will be explained later.

The memory unit 330 stores a program for achieving the basic functions of the image display apparatus 300, a program executed by the control unit 320, and data used by these programs. The input image registration area 331 is an area for registering the image data received from the monitoring camera 100. The speed measurement image registration area 332 is an area of images which are captured by the vehicle monitoring cameras 105 to 107 and the vehicle monitoring cameras 112 to 114 and which are used to register image data saved in order to perform speed measurement. The virtual object model registration area 333 is an area for registering a virtual body of an object (hereinafter referred to as "virtual object model") generated from object regions of images captured by the front surface monitoring camera 101, the back surface monitoring camera 102, the side surface monitoring cameras 103, 104 installed in the object three-dimensional model generation area 14 and the front surface monitoring camera 108, the back surface monitoring camera 109, the side surface monitoring cameras 110 and 111 installed in the object three-dimensional model generation area 15. The object three-dimensional model registration area 334 is an area for registering the object three-dimensional model generated by performing mapping on the virtual object model.

The HDD unit 340 stores a program executed by the control unit 320 and data used by this program. The background image registration area 341 is an area for registering image data of a background image captured by the front surface monitoring camera 101, the back surface monitoring camera 102, the side surface monitoring cameras 103 and 104, and the vehicle monitoring cameras 105 to 107, the front surface monitoring camera 108, the back surface monitoring camera 109, the side surface monitoring cameras 110 and 111, and the vehicle monitoring cameras 112 to 114.

In response to the image display I/F unit 350 receiving an image signal from the image display processing unit 328, the image display I/F unit 350 outputs the image signal to the monitor 400.

The operation input I/F unit 360 receives an operation signal from the mouse 500, converts the operation signal into operation data that can be analyzed by the control unit 320, and outputs the operation signal to the control unit 320.

The data bus 370 connects each unit 310 to 360, and exchange data.

A procedure for generating a virtual viewpoint image performed by the image display apparatus 300 will be explained with reference to FIG. 3. The explanation will be made using an example where a virtual viewpoint image is generated by composing an image of an object three-dimensional model generated from images captured by the front surface monitoring camera 101, the back surface monitoring camera 102, and the side surface monitoring cameras 103 and 104 installed in the object three-dimensional model generation area 14 of the up-line traffic lane 12 of the roadway 10 as shown in FIG. 1 and the background images captured by the vehicle monitoring cameras 105 to 107 installed in the roadway 10. The procedure for generating the virtual viewpoint image will be performed in the order from step S100 to step S800.

(Step S100) The background image generation processing unit 321 as shown in FIG. 2 generates a background image not showing any object such as a vehicle from images captured by the front surface monitoring camera 101, the back surface monitoring camera 102, the side surface monitoring cameras 103, 104, and the vehicle monitoring cameras 105 to 107 installed in the object three-dimensional model generation area 14 as shown in FIG. 1, and saves the image data of the background image to the background image registration area 341 of the HDD unit 340.

(Step S200) The camera image input processing unit 322 receives image data of images captured by the front surface monitoring camera 101, the back surface monitoring camera 102, and the side surface monitoring cameras 103 and 104 installed in the object three-dimensional model generation area 14 as shown in FIG. 1 and images captured by the vehicle monitoring cameras 105 to 107, and saves the image data to the input image registration area 331. The camera image input processing unit 322 saves, to the speed measurement image registration area 332, image data of images captured by the vehicle monitoring camera 105 with a predetermined interval of time in order to measure to speed of vehicles travelling on the roadway 10.

(Step S300) The object extraction processing unit 323 retrieves the image data of the front surface monitoring camera 101, the back surface monitoring camera 102, and the side surface monitoring cameras 103 and 104 from the input image registration area 331, and retrieves the background image data of the front surface monitoring camera 101, the back surface monitoring camera 102, and the side surface monitoring cameras 103, 104 from the background image registration area 341. The object extraction processing unit 323 compares the image data and the background image data thus received, whereby the virtual object model as shown in FIG. 3 is extracted and saved to the virtual object model registration area 333.

(Step S400) The mapping processing unit 324 retrieves pixels of the image data captured by the front surface monitoring camera 101, the back surface monitoring camera 102, and the side surface monitoring cameras 103 and 104 from the input image registration area 331, and retrieves the virtual object model from the virtual object model registration area 333. The mapping processing unit 324 performs mapping of the pixels of the image data of the input image registration area 331 with the virtual object model, whereby the three-dimensional body of the object as shown in FIG. 3 (hereinafter referred to as "object three-dimensional model") is generated and saved to the object three-dimensional model registration area 334 of the memory unit 330.

(Step S500) The object three-dimensional model selection processing unit 325 selects an object three-dimensional model corresponding to a vehicle of an image displayed on the monitor 400 from the object three-dimensional model registration area 334.

(Step S600) The viewpoint conversion processing unit 326 separately converts both of the object three-dimensional model selected by the object three-dimensional model selection processing unit 325 and the background images of the vehicle monitoring cameras 105 to 107 registered in the background image registration area 341 of the HDD unit 340 into virtual viewpoint images.

(Step S700) The background and object three-dimensional model composing processing unit 327 composes the background image and the object three-dimensional model so that the object three-dimensional model is at the position where the object existed in the background image.

(Step S800) The image display processing unit 328 converts the image data of the image obtained by composing the object three-dimensional model with the background image into an image signal that can be displayed by the monitor 400, and outputs the image signal to the image display I/F unit 350.

Figure 4B:
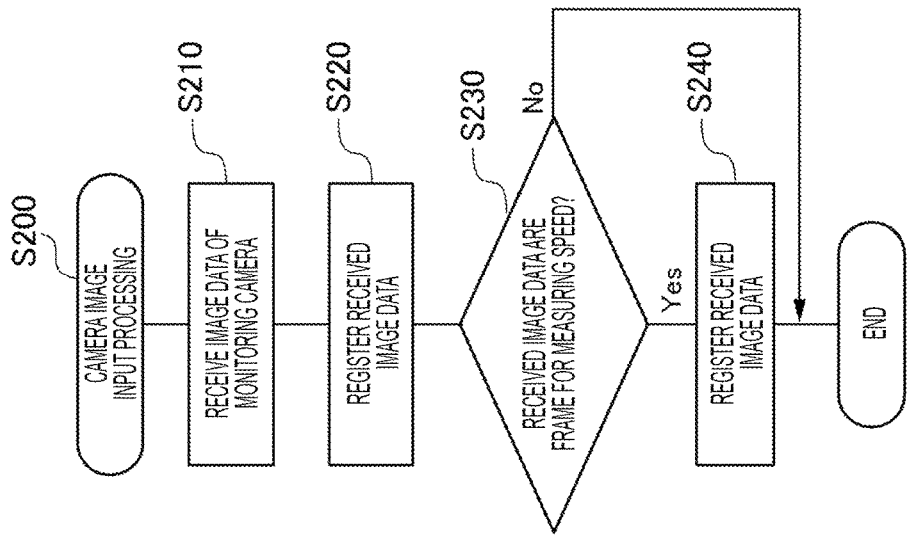
FIG. 4B is a flowchart of camera video input processing according to an exemplary embodiment of the present invention.
Figure 4A:
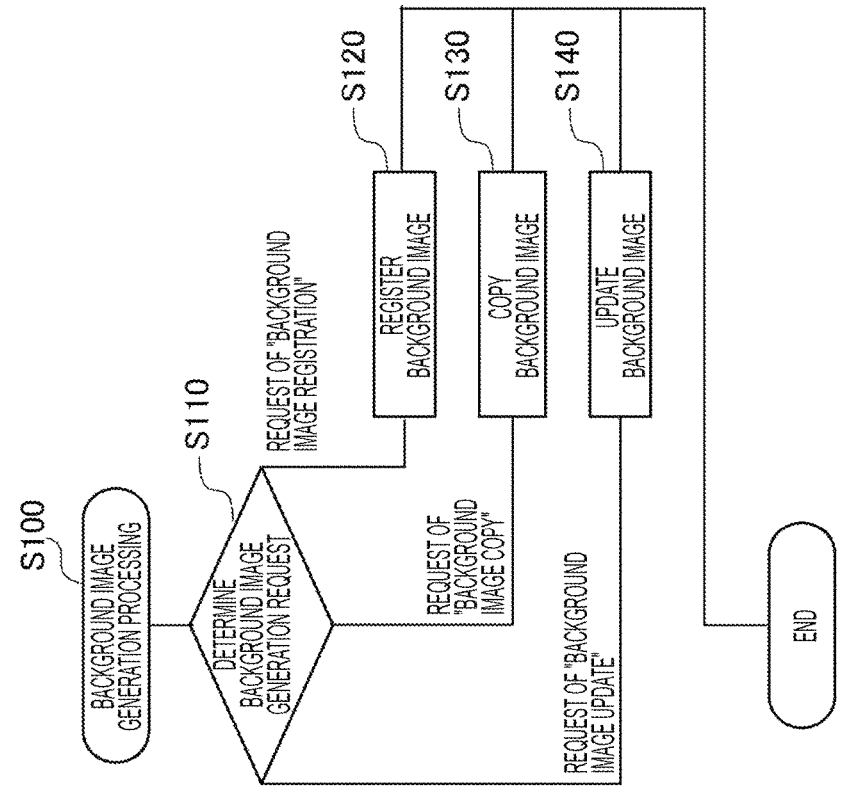
FIG. 4A is a flowchart of background image generation processing according to an exemplary embodiment of the present invention.

The details of background image generation processing performed by the background image generation processing unit 321 in step S100 will be explained according to the order of steps as shown in the flowchart of background image generation processing as shown in FIG. 4A. In response to the observer using the mouse 500 to perform operation of a background image generation request for generating a background image, the operation input I/F unit 360 outputs operation data of the background image generation request to the control unit 320. In response to the control unit 320 receiving the operation data of the background image generation request, the control unit 320 activates the background image generation processing unit 321. In response to the background image generation processing unit 321 being activated, the background image generation processing unit 321 starts the background image generation processing.

(Step S110) The background image generation processing unit 321 analyzes the operation data of the background image generation request, and determines whether the operation data of the background image generation request is any one of "background image registration", "background image copy", and "background image update". In response to a determination that the operation data of the background image generation request is the "background image registration", step S120 is performed. In response to a determination that the operation data of the background image generation request is the "background image copy", step S130 is performed. In response to a determination that the operation data of the background image generation request is the "background image update", step S140 is performed.

(Step S120) In response to the determination that the operation data of the background image generation request is the "background image registration", the background image generation processing unit 321 uses the front surface monitoring camera 101, the back surface monitoring camera 102, the side surface monitoring cameras 103, 104, and the vehicle monitoring cameras 105 to 107 to capture images in response to any vehicle not being shown and only the background is shown, and registers the image data of the captured images to the background image registration area 341 of the HDD unit 340. The background image generation processing unit 321 terminates the background image generation processing.

(Step S130) In response to a determination that the operation data of the background image generation request is the "background image copy", the background image generation processing unit 321 copies the image data of the image in which any object such as a vehicle is not shown from the input image registration area 331 to the background image registration area 341. The background image generation processing unit 321 terminates the background image generation processing.

(Step S140) In response to a determination that the operation data of the background image generation request is the "background image update", the background image generation processing unit 321 receives image data of input images from the input image registration area 331 with a regular interval of time, and in response to the background image generation processing unit 321 receiving the image data of the background image from the background image registration area 341, the background image generation processing unit 321 updates the background image data of the background image registration area 341 by obtaining weighted average of these image data. The update of the background image data is stopped when a stop request of "background image update" is received. The background image generation processing unit 321 terminates the background image generation processing.

The details of the camera image input processing performed by the camera image input processing unit 322 in step S200 will be explained according to the order of steps as shown in the flowchart of the camera image input processing as shown in FIG. 4B. In response to the communication I/F unit 310 receiving the image data from the monitoring camera 100, the communication I/F unit 310 outputs an image data reception notification to the control unit 320. In response to the control unit 320 receiving the image data reception notification, the control unit 320 activates the camera image input processing unit 322. In response to the camera image input processing unit 322 being activated, the camera image input processing unit 322 starts the camera image input processing.

(Step S210) The camera image input processing unit 322 receives image data of images captured by the monitoring camera 100.

(Step S220) The camera image input processing unit 322 registers the image data to the input image registration area 331.

(Step S230) The camera image input processing unit 322 determines whether the received image data is a frame extracted in order to perform the speed measurement. In response to a determination that the image data is a frame extracted in order to perform the speed measurement (Yes in step S230), step S240 is performed. In response to a determination that the image data is not a frame extracted in order to perform the speed measurement (No in step S230), the camera video input processing is terminated.

(Step S240) The camera image input processing unit 322 registers image data of a frame extracted in order to perform the speed measurement to the speed measurement image registration area 332. Thereafter, the camera image input processing unit 322 terminates the camera image input processing.

Figure 5B:
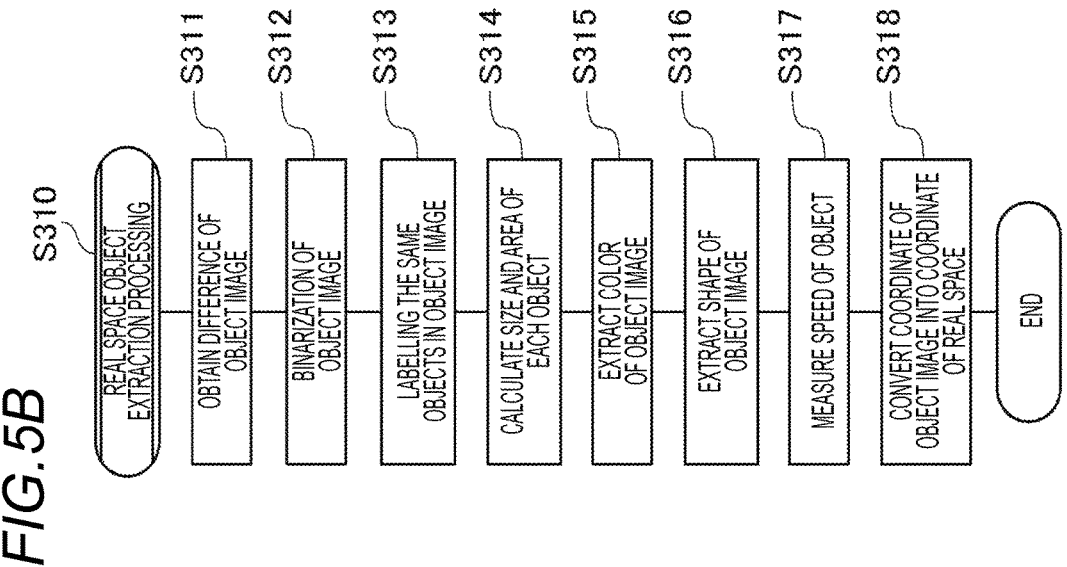
FIGS. 5A and 5B are flowcharts of object extraction processing according to an exemplary embodiment of the present invention.
Figure 5A:
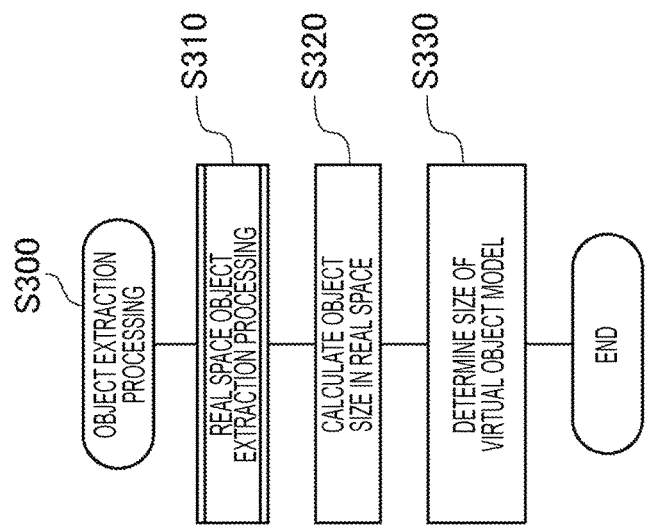

The details of the object extraction processing performed by the object extraction processing unit 323 in step S300 will be explained according to the order of steps as shown in the flowchart of the object extraction processing as shown in FIG. 5B. In response to an operation of the virtual viewpoint image generation request for generating the virtual viewpoint image is performed with the mouse 500, the operation input I/F unit 360 outputs the operation data of the virtual viewpoint image generation request to the control unit 320. In response to the control unit 320 receiving the operation data of the virtual viewpoint image generation request, the control unit 320 activates the object extraction processing unit 323. In response to the object extraction processing unit 323 being activated, the object extraction processing unit 323 starts the object extraction processing.

(Step S310) The object extraction processing unit 323 performs real space object extraction processing for extracting an object of an image as an object in a real space. The details of the real space object extraction processing will be explained later.

(Step S320) The object extraction processing unit 323 calculates the size of an object in the real space extracted in the real space object extraction processing.

(Step S330) The object extraction processing unit 323 determines the size of the virtual object model from the size of the object in the real space calculated in step S320.

The details of the real space object extraction processing performed by the object extraction processing unit 323 in step S310 will be explained according to the order of steps as shown in the flowchart of the real space object extraction processing as shown in FIG. 5B.

(Step S311) In response to the object extraction processing unit 323 retrieving image data of the front surface monitoring camera 101, the back surface monitoring camera 102, and the side surface monitoring cameras 103 and 104 from the input image registration area 331, and retrieves background image data of the front surface monitoring camera 101, the back surface monitoring camera 102, and the side surface monitoring cameras 103 and 104 from the background image registration area 341, the object extraction processing unit 323 obtains a difference (extraction) of the object image by subtracting the image of the background image data from the image data.

(Step S312) In a case where the object image obtained by the difference in step S311 is of 256 levels, the object extraction processing unit 323 causes a level equal to or more than the threshold value to be 255 levels, and causes a level less than the threshold value to be zero level, thus performing binarization.

(Step S313) The object extraction processing unit 323 performs labeling to attach a label to the same object in the object image made by the binarization in step S312.

(Step S314) The sizes (a start point coordinate, a width, and a height) and the size of area (the number of white pixels of binarized pixels) are calculated for each object to which a label is attached in step S313.

(Step S315) The object extraction processing unit 323 calculates a histogram of color of the image, the most frequent color, and the least frequent color for a portion of white pixels of the binarized object image for each object to which a label is attached, thus extracting the colors of the object.

(Step S316) The object extraction processing unit 323 calculates the barycenter, the length of the surrounding, the degree of circle, Euler number, moment, and the number of corners for a portion of white pixels of the binarized object image for each object to which a label is attached, thus extracting the shape of the object.

(Step S317) In response to the object extraction processing unit 323 retrieving the image data from the input image registration area 331, and retrieving the speed measurement image data from the speed measurement image registration area 332, the object extraction processing unit 323 calculates an optical flow using the image of the image data and the image of the speed measurement image data. A start point and an endpoint on the image obtained from an optical flow are converted into a coordinate of the real space, and the moving distance from the coordinate of the real space is calculated, whereby the speed of the object is measured.

(Step S318) The object extraction processing unit 323 uses information about the angle of depression, the height, and the focal point distance of the front surface monitoring camera 101, the back surface monitoring camera 102, and the side surface monitoring cameras 103, 104 of the input image registration area 331 to convert the coordinate of the object image into the coordinate of the real space. Thereafter, the object extraction processing unit 323 terminates the object extraction processing.

The details of the mapping processing performed by the mapping processing unit 324 in step S400 will be explained according to the order of steps as shown in the flowchart of the mapping processing as shown in FIG. 6A. In response to the object extraction processing unit 323 terminating the object extraction processing, the control unit 320 activates the mapping processing unit 324. In response to the mapping processing unit 324 being activated, the mapping processing unit 324 starts the mapping processing.

(Step S410) The mapping processing unit 324 extracts a predetermined pasting portion where the density of the number of pixels is greater than or equal to a certain level from the object region extracted from the image of the front surface monitoring camera 101 from the front surface of the virtual object model, and enlarges or reduces the portion according to the size of the virtual object model and pastes the portion to the front surface portion of the virtual object model, thus performing mapping. In enlargement and reduction, for example, bi-linear interpolation and the like may be used to prevent the pixel density from being degraded due to enlargement and reduction.

(Step S420) The mapping processing unit 324 extracts a predetermined pasting portion where the density of the number of pixels is greater than or equal to a certain level from the object region extracted from the image of the back surface monitoring camera 102 from the back surface of the virtual object model, and enlarges or reduces the portion according to the size of the virtual object model and pastes the portion to the back surface portion of the virtual object model, thus performing mapping. In enlargement and reduction, for example, bi-linear interpolation and the like may be used to prevent the pixel density from being degraded due to enlargement and reduction.

(Step S430) The mapping processing unit 324 extracts predetermined pasting portions where the density of the number of pixels is greater than or equal to a certain level from the object regions extracted from the images of the side surface monitoring cameras 103 and 104 from the side surfaces of the virtual object model, and enlarges or reduces the portion according to the size of the virtual object model and pastes the portion to the side surface portions of the virtual object model, thus performing mapping. In enlargement and reduction, for example, bi-linear interpolation and the like may be used to prevent the pixel density from being degraded due to enlargement and reduction.

(Step S440) The mapping processing unit 324 needs to paste the images of the front surface monitoring camera 101 or the back surface monitoring camera 102, either of which with the higher resolution, with the upper surface of the virtual object model. Therefore, in response to the image of the back surface monitoring camera 102 being pasted, and in a case where the image of the front surface monitoring camera 101 and the pasting region overlap each other, a determination is made as to whether the number of pixels is high or not in the pasting region that overlaps the image of the front surface monitoring camera 101. In response to the number of pixels being high, the upper surface is generated by enlarging and reducing the image of the original region according to the size of the virtual object model and pasting the image to the upper surface of the virtual object model. In response to the number of pixels being small, the upper surface is generated by enlarging or reducing the image of the region obtained by deleting the overlapping portion from the extracted region in accordance with the size of the virtual object model and pasting the image to the upper surface of the virtual object model.

(Step S450) The mapping processing unit 324 registers the object three-dimensional model generated by mapping the virtual object model to the object three-dimensional model registration area 334. Thereafter, the mapping processing unit 324 terminates the mapping processing.

The details of the object and three-dimensional model selection processing performed by the object three-dimensional model selection processing unit 325 in step S500 will be explained according to the order of steps as shown in the flowchart of FIG. 6B. In response to the mapping processing unit 324 terminating the mapping processing, the control unit 320 activates the object three-dimensional model selection processing unit 325. In response to the object three-dimensional model selection processing unit 325 being activated, the object three-dimensional model selection processing unit 325 starts the object three-dimensional model selection processing.

(Step S510) The object three-dimensional model selection processing unit 325 compares the sizes, the shapes, and the colors of the object image of the images captured by the vehicle monitoring cameras 105 to 107 and the object three-dimensional model registered in the object three-dimensional model registration area 334. In response to a selection being made with a high degree of accuracy, the object three-dimensional model selection processing unit 325 further compares the coordinate of the object image detected in the object extraction processing explained above (hereinafter referred to as "the position of the object") and the speed of the object measured.

(Step S520) In response to the object three-dimensional model selection processing unit 325 selecting the object three-dimensional model combined with the background image of the vehicle monitoring camera 105 on the basis of the comparison result, the object three-dimensional model selection processing unit 325 terminates the object three-dimensional model selection processing. It should be noted that the selection of the object three-dimensional model can also be made by using not only the size, the shape, the color, the position of the object, and the speed of the object but also information such as the time when the object three-dimensional model is registered.

The details of the viewpoint conversion processing performed by the viewpoint conversion processing unit 326 in step S600 will be explained according to the order of steps as shown in the flowchart of the viewpoint conversion processing as shown in FIG. 7A. In response to the object three-dimensional model selection processing unit 325 terminating the object three-dimensional model selection processing, the control unit 320 activates the viewpoint conversion processing unit 326. In response to the viewpoint conversion processing unit 326 being activated, the viewpoint conversion processing unit 326 starts the viewpoint conversion processing.

(Step S610) The viewpoint conversion processing unit 326 converts the selected object three-dimensional model from the coordinate of the real space to the coordinate of the background image of the vehicle monitoring camera 105.

(Step S620) The viewpoint conversion processing unit 326 rotates the coordinate so that the coordinate-converted object three-dimensional model is made into an object three-dimensional model that is seen from a designated virtual viewpoint.

(Step S630) Viewpoint conversion processing unit 326 rotates the coordinate so that the background image of the vehicle monitoring camera 105 is made into a background image that is seen from a designated virtual viewpoint. Thereafter, the viewpoint conversion processing unit 326 terminates the viewpoint conversion processing.

The details of the background and object three-dimensional model composing processing performed by the background and object three-dimensional model composing processing unit 327 in step S700 will be explained according to the order of steps as shown in the flowchart of the background and object three-dimensional model composing processing as shown in FIG. 7B. In response to the viewpoint conversion processing unit 326 terminating the viewpoint conversion processing, the control unit 320 activates the background and object three-dimensional model composing processing unit 327. In response to the background and object three-dimensional model composing processing unit 327 is activated, the background and object three-dimensional model composing processing unit 327 starts the background and object three-dimensional model composing processing.

(Step S710) The background and object three-dimensional model composing processing unit 327 retrieves the display surface to be pasted on the background image from the object three-dimensional model.

(Step S720) The background and object three-dimensional model composing processing unit 327 enlarges or reduces the display surface of the object three-dimensional model so that it is the same size as the object existing in the image captured by the vehicle monitoring camera 105.

(Step S730) The background and object three-dimensional model composing processing unit 327 composes the display surface of the object three-dimensional model at the position where the object exists in the original image of the background image. Thereafter, the background and object three-dimensional model composing processing unit 327 terminates the background and object three-dimensional model composing processing.

The details of the image display processing performed by the image display processing unit 328 in step S800 will be explained according to the order of steps as shown in the flowchart of the image display processing as shown in FIG. 7C. In response to the background and object three-dimensional model composing processing unit 327 terminating the background and object three-dimensional model composing processing, the control unit 320 activates the image display processing unit 328. In response to the image display processing unit 328 being activated, the image display processing unit 328 starts the image display processing.

(Step S810) In response to the image display processing unit 328 converting the image data of the background image in which the display surface of the object three-dimensional model is composed into an image signal that can be displayed, the image display processing unit 328 outputs the image signal via the image display I/F unit 350 to the monitor 400. Accordingly, the image of the vehicle monitoring camera 105 converted into the virtual viewpoint designated with the monitor 400 is displayed. The image display processing unit 328 terminates the image display processing.

Figure 8A:
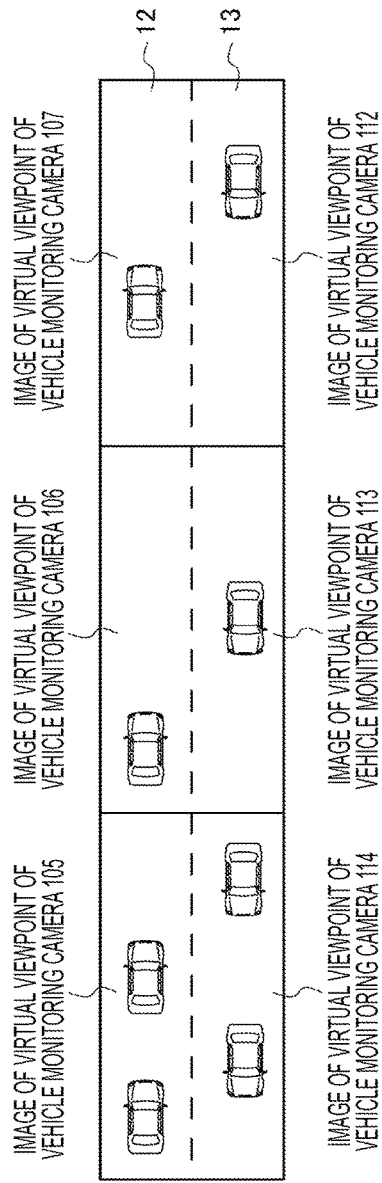
FIG. 8A is a figure illustrating an example of displaying an image of vehicles seen from a virtual viewpoint according to an exemplary embodiment of the present invention.
Figure 8B:
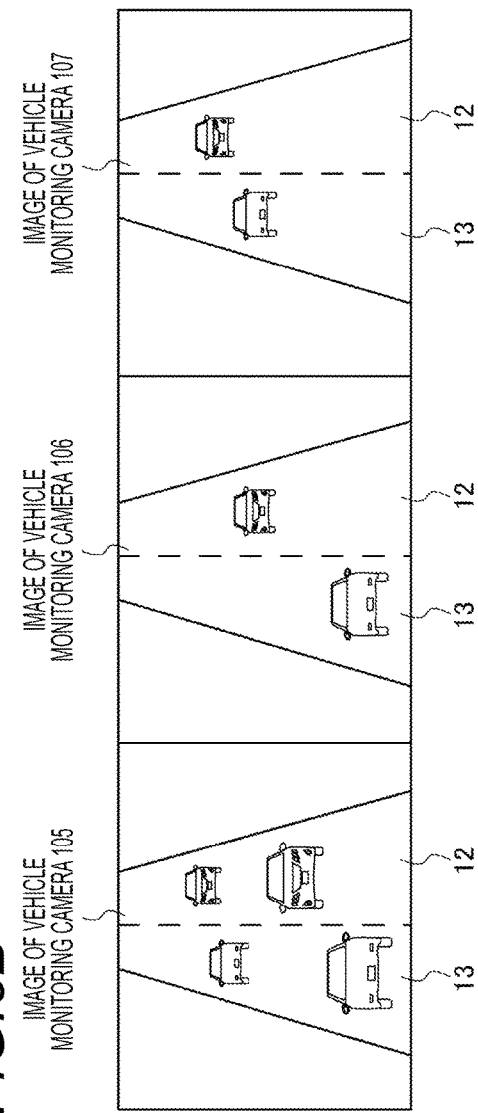
FIG. 8B is a figure illustrating an example of displaying an image of actual vehicles according to an exemplary embodiment of the present invention.

Images obtained when the virtual viewpoint image generated on the basis of the front surface monitoring camera 101, the back surface monitoring camera 102, and the side surface monitoring cameras 103 and 104 installed in the object three-dimensional model generation area 14 of the up-line traffic lane 12 as shown in FIG. 1 is seen upon being moved to the virtual viewpoints above the vehicle monitoring cameras 105 to 107 and images obtained when the virtual viewpoint image generated on the basis of the front surface monitoring camera 108, the back surface monitoring camera 109, and the side surface monitoring cameras 110 and 111 installed in the object three-dimensional model generation area 15 of the down-line traffic lane 13 is seen upon being moved to the virtual viewpoints above the vehicle monitoring cameras 112 to 114 are shown in FIG. 8A. Images of the vehicle monitoring cameras 105 to 107 in the up-line traffic lane 12 (images of the vehicle monitoring cameras 112 to 114 in the down-line traffic lane 13 are similar, but are not shown in the drawing) are shown in FIG. 88B. As described above, even when the images of the vehicle monitoring cameras 105 to 107 in the up-line traffic lane 12 and the images of the vehicle monitoring cameras 112 to 114 in the down-line traffic lane 13 as shown in FIG. 8B are converted into the images that are seen from above the vehicle, the present invention allows the images to be converted into the images that are seen from above the vehicle as shown in FIG. 8A in which the image of the vehicle 700 is not distorted in proportional to the height of the vehicle. With regard to the direction of the object three-dimensional model of the vehicle displayed in FIG. 8A, a determination is made as to in which of the up-line traffic lane or the down-line traffic lane the position of the vehicle, i.e., the object detected in the object extraction processing, exists. For example, in a case where there is a vehicle in the up-line traffic lane, arrangement is made in such a manner that the front surface of the vehicle is located in the traveling direction of the up-line traffic lane of the virtual viewpoint image, and the back surface of the vehicle is located oppositely to the traveling direct, so that the direction of the object three-dimensional model of the vehicle can be correctly set. As described above, the image that is seen from the virtual viewpoint above the vehicle can be displayed, and therefore, the position of the vehicle and the distance between vehicles can be found, so that the traffic jam and accidents can be detected in a short time.

Figure 9:
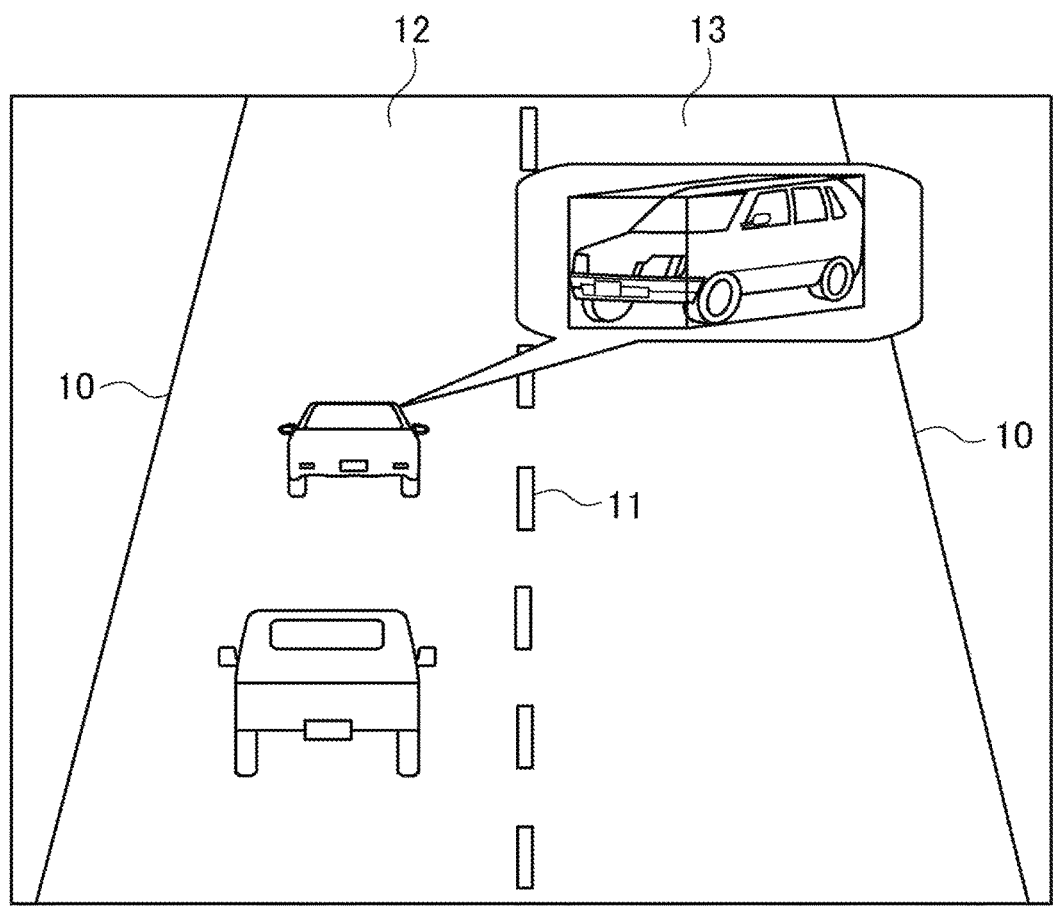
FIG. 9 is a figure illustrating an example of simultaneously displaying an image of vehicles seen from a virtual viewpoint and an image of actual vehicles according to an exemplary embodiment of the present invention.
Figure 10A:
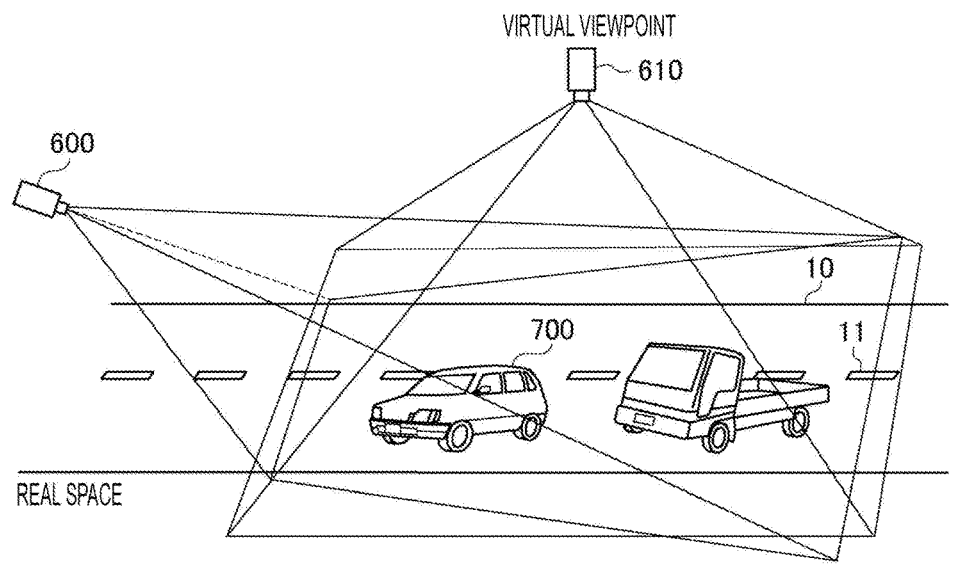
FIGS. 10A and 10B are figures of an example where a converted image of a vehicle is distorted when an image of a vehicle is conventionally converted into a virtual viewpoint image.
Figure 10B:
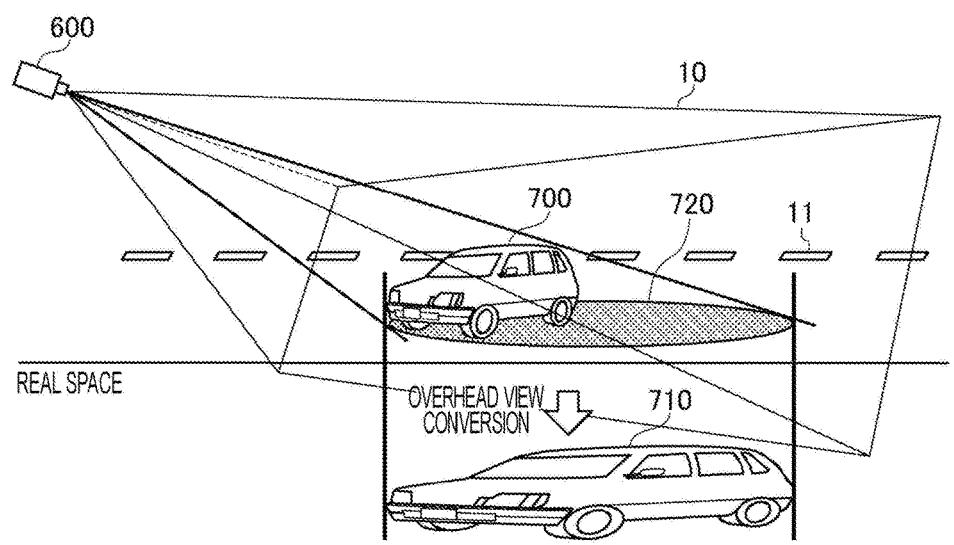

According to the exemplary embodiment, the entire image of the vehicle monitoring cameras 105 to 107 in the up-line traffic lane 12 and the vehicle monitoring cameras 112 to 114 in the down-line traffic lane 13 are converted into the virtual viewpoint image, but, for example, as shown in FIG. 9, any one of the images of the vehicle monitoring cameras 105 to 107 and the vehicle monitoring cameras 112 to 114, the vehicle image displayed in the image, and the object three-dimensional model can be displayed at a time. More specifically, the object three-dimensional model is made into an icon, and when this icon is clicked, the object three-dimensional model can be displayed in a separate window. Further, when the object three-dimensional model displayed in the separate window is manipulated, the object three-dimensional model that is seen from a virtual viewpoint of any angle can be enlarged or reduced and can be displayed, and therefore, the license plate and the driver of the vehicle can be easily confirmed.

According to the exemplary embodiment, the object three-dimensional model generation area 14 is provided before the positions of the vehicle monitoring cameras 105 to 107 in the up-line traffic lane 12, and the object three-dimensional model generation area 15 is provided before the positions of the vehicle monitoring cameras 112 to 114 in the down-line traffic lane 13, but the exemplary embodiment is not limited thereto, and the object three-dimensional model generation area 14 may be provided after or in the middle of the positions of the vehicle monitoring cameras 105 to 107 in the up-line traffic lane 12, and the object three-dimensional model generation area 15 may be provided after or in the middle of the positions of the vehicle monitoring cameras 112 to 114 in the down-line traffic lane 13.

As described above, the image display apparatus according to the present invention separates the background image and the object image from the image captured by the camera, generates the virtual object model from the images obtained by capturing the four sides, i.e., front, back, right, and left of the object, and maps the pixels of the actual object image to this virtual object model, thus generating the object three-dimensional model. The object three-dimensional model of the object to be combined with the background image is selected from the object three-dimensional models thus generated on the basis of information about the size, the shape, the color, the position of the object, and the speed. The viewpoint conversion is performed to separately convert the selected object three-dimensional model and the background image into designated virtual viewpoint images, so that the object three-dimensional model and the background image are composed. As described above, the actual image is converted into the virtual viewpoint image, so that the image of the object can be displayed without distortion.

When the above is summarized, the present invention has the following features.

(1) An image display apparatus according to the present invention includes background image obtaining means for retrieving a background image from an image, virtual object model extraction means for extracting a virtual object model from the image and the background image, object three-dimensional model generation means for generating an object three-dimensional model from the virtual object model, background image viewpoint conversion means for performing viewpoint conversion on the background image, object three-dimensional model viewpoint conversion means for performing viewpoint conversion on the object three-dimensional model, and composing means for combining the background image and the object three-dimensional model that have been viewpoint-converted.

(2) The object three-dimensional model generation means of the image display apparatus of the present invention according to (1) includes mapping means for mapping the image to the virtual object model.

(3) The mapping means of the image display apparatus of the present invention according to (2) performs mapping using the images captured by at least two cameras with different angles.

(4) The mapping means of the image display apparatus of the present invention according to (3) includes, in response to a region on which the mapping is performed with the image overlapping, the mapping means performs mapping by using the image of which number of pixels is larger.

(5) The virtual object model extraction means of the image display apparatus of the present invention according to any one of (1) to (4) includes feature extraction means for extracting a feature of the virtual object model and object three-dimensional model selection means for selecting the object three-dimensional model according to the feature extracted by the feature extraction means.

(6) The virtual object model extraction means of the image display apparatus of the present invention according to (5) includes speed measurement means for measuring a speed of an object corresponding to the virtual object model, and the object three-dimensional model selection means selects the object three-dimensional model combined with the background image by using the speed.

(7) The virtual object model extraction means of the image display apparatus of the present invention according to any one of (5) and (6) includes position detection means for detecting a position of the object corresponding to the virtual object model, and the object three-dimensional model selection means uses the position of the object to select the object three-dimensional model combined with the background image.

(8) The image display apparatus of the present invention according to any one of (1) to (7) includes, in response to the object three-dimensional model being combined with the background image, the object three-dimensional model is set so that the object three-dimensional model is in the same direction as a direction of a region where the object three-dimensional model is arranged.

(9) An image display method according to the present invention includes a background image obtaining step for retrieving a background image from an image, a virtual object model extraction step for extracting a virtual object model from the image and the background image, an object three-dimensional model generation step for generating an object three-dimensional model from the virtual object model, a background image viewpoint conversion step for performing viewpoint conversion on the background image, an object three-dimensional model viewpoint conversion step for performing viewpoint conversion on the object three-dimensional model, and a composing step for combining the background image and the object three-dimensional model that have been viewpoint-converted.

(10) The object three-dimensional model generation step of the image display method of the present invention according to (9) includes a mapping step for mapping the image to the virtual object model.

(11) The mapping step of the image display method of the present invention according to (10) performs mapping using the images captured by at least two cameras with different angles.

(12) The mapping step of the image display method of the present invention according to (11) includes, in response to a region on which the mapping is performed with the image overlapping, the mapping step performs mapping by using the image of which number of pixels is larger.

(13) The virtual object model extraction step of the image display method of the present invention according to any one of (9) to (12) includes a feature extraction step for extracting a feature of the virtual object model, and an object three-dimensional model selection step for selecting the object three-dimensional model according to the feature extracted in the feature extraction step.

(14) The virtual object model extraction step of the image display method of the present invention according to (13) includes a speed measurement step for measuring a speed of an object corresponding to the virtual object model, and the object three-dimensional model selection step selects the object three-dimensional model combined with the background image by using the speed.

(15) The virtual object model extraction step of the image display method of the present invention according to any one of (13) and (14) includes a position detection step for detecting a position of the object corresponding to the virtual object model, and the object three-dimensional model selection step uses the position of the object to select the object three-dimensional model combined with the background image.

(16) The image display method of the present invention according to any one of (9) to (15) includes, when the object three-dimensional model is combined with the background image, the object three-dimensional model is set so that the object three-dimensional model is in the same direction as a direction of a region where the object three-dimensional model is arranged.

(17) A non-transitory computer-readable medium storing an executable image display program that, in response to being executed, cause a computer to perform the image display method of the present invention according to any one of (9) to (16).

As described above, when an image captured by a camera is converted into a virtual viewpoint image, the present invention can convert and display the image so that the object is not distorted.

The present invention has been explained based on the exemplary embodiments, but the exemplary embodiment is an example of the present invention, and it is to be understood that the present invention is not limited to the exemplary embodiments.

This application claims the benefit of the priority based on Japanese Patent Application No. 2013-056729 filed on Mar. 19, 2013, and the entire disclosure thereof is incorporated herein by reference.

INDUSTRIAL APPLICABILITY

The present invention can be applied to an apparatus for converting an image into a virtual viewpoint image.

REFERENCE SIGNS LIST 10 roadway
11 center line
12 up-line traffic lane
13 down-line traffic lane
14 object three-dimensional model generation area
15 object three-dimensional model generation area
20 image display system
20C monitoring center
100 monitoring camera
101 front surface monitoring camera
102 back surface monitoring camera
103, 104 side surface monitoring camera
105 to 107 vehicle monitoring camera
108 front surface monitoring camera
109 back surface monitoring camera
110, 111 side surface monitoring camera
112 to 114 vehicle monitoring camera
200 network
300 image display apparatus
310 communication I/F unit
320 control unit
321 background image generation processing unit
322 camera image input processing unit
323 object extraction processing unit
324 mapping processing unit
325 object three-dimensional model selection processing unit
326 viewpoint conversion processing unit
327 background and object three-dimensional model composing processing unit
328 image display processing unit
330 memory unit
331 input image registration area
332 speed measurement image registration area
333 virtual object model registration area
334 object three-dimensional model registration area
340 HDD unit
341 background image registration area
341, 350 image display I/F unit
360 operation input I/F unit
400 monitor
500 mouse
600 monitoring camera
610 virtual viewpoint
700 vehicle
710 virtual viewpoint image
720 projection onto roadway seen from monitoring camera

The invention claimed is:

1. An image display apparatus comprising:
a background image obtaining processing unit configured to retrieve a background image from images captured by at least two cameras with different angles in a state where there is no object and save the background image to a background image registration area;
a virtual object model extraction processing unit configured to extract a virtual object model by comparing the images captured from the at least the two cameras with the background image retrieved from the background image registration area and save the virtual object model to a virtual object model registration area;
an object three-dimensional model generation processing unit including a mapping processing unit configured to map pixels of the images captured by the at least two cameras with different angles onto the virtual object model retrieved from the virtual object model registration area and save the object three-dimensional model to an object three-dimensional model registration area;
a background image viewpoint conversion processing unit configured to convert a viewpoint of the background image retrieved from the background image registration area into a background image having a virtual viewpoint;
an object three-dimensional model viewpoint conversion processing unit configured to convert a viewpoint of the object three-dimensional model retrieved from the object three-dimensional model registration area into an object three-dimensional model having the virtual viewpoint; and
a composing processing unit configured to compose the background image having the virtual viewpoint and the object three-dimensional model having the virtual viewpoint,
wherein when a region on which the mapping is performed with the image overlaps, the mapping processing unit is further configured to perform mapping by using the image of which a number of pixels is larger.

2. The image display apparatus claim 1, wherein the virtual object model extraction processing unit includes:
a feature extraction processing unit configured to extract a feature of the virtual object model based at least in part on any one of a size, a shape and a color of the image; and
an object three-dimensional model selection processing unit configured to select the object three-dimensional model according to the feature extracted by the feature extraction processing unit.

3. The image display apparatus of claim 1,
wherein the virtual object model extraction processing unit includes a speed measurement processing unit configured to measure a speed of an object corresponding to the virtual object model, and
wherein the object three-dimensional model selection processing unit is configured to select the object three-dimensional model combined with the background image by using the speed.

4. The image display apparatus of claim 1, wherein in response to the object three-dimensional model being combined with the background image, the object three-dimensional model is set so that the object three-dimensional model is in the same direction as a direction of a region where the object three-dimensional model is arranged.

5. The image display apparatus according of claim 1, wherein the object is a vehicle moving in a traffic lane.

6. The image display apparatus according of claim 5, wherein the virtual viewpoint is set above the vehicle in the traffic lane.

7. A non-transitory computer-readable medium storing an executable image display program that, in response to being executed, cause a computer to perform operations comprising:
background image obtaining processing for retrieving a background image from images captured by at least two cameras with different angles in a state where there is no object;

virtual object model extraction processing for extracting a virtual object model by comparing the images captured from at least the two cameras with the background image;

object three-dimensional model generation processing for generating an object three-dimensional model from the virtual object model by mapping pixels of the images captured by the at least two cameras with different angles onto the virtual object model;

background image viewpoint conversion processing for converting a viewpoint of the background image into a background image having a virtual viewpoint;

object three-dimensional model viewpoint conversion processing for converting a viewpoint of the object three-dimensional model into an object three-dimensional model having the virtual viewpoint; and composing processing for combining the background image and the object three-dimensional model that have been viewpoint-converted, wherein when a region on which the mapping is performed with the image overlaps, the mapping processing performs mapping by using the image of which number of pixels is larger.

8. The non-transitory computer readable medium of claim 7, wherein the virtual object model extraction processing includes:

feature extraction processing for extracting a feature of the virtual object model based at least in part on any one of a size, a shape and a color of the image; and object three-dimensional model selection processing for selecting the object three-dimensional model according to the feature extracted by the feature extraction processing.

9. The non-transitory computer readable medium of claim 7, wherein the virtual object model extraction processing includes speed measurement processing for measuring a speed of an object corresponding to the virtual object model, and wherein the object three-dimensional model selection processing selects the object three-dimensional model combined with the background image by using the speed.

10. The non-transitory computer readable medium of claim 7, wherein when the object three-dimensional model is combined with the background image, the object three-dimensional model is set so that the object three-dimensional model is in the same direction as a direction of a region where the object three-dimensional model is arranged.

11. The non-transitory computer readable medium of claim 7, wherein the object is a vehicle moving in a traffic lane.

12. The non-transitory computer readable medium of claim 11, wherein the virtual viewpoint is set above the vehicle on the traffic lane.

* * * * *